(12) United States Patent
Jung

(10) Patent No.: US 7,639,328 B2
(45) Date of Patent: Dec. 29, 2009

(54) VIEWING ANGLE CONTROLLABLE LIQUID CRYSTAL DISPLAY DEVICE

(75) Inventor: Mi Jun Jung, Busan (KR)

(73) Assignee: LG Display Co., Ltd., Seoul (KR)

( * ) Notice: Subject to any disclaimer, the term of this patent is extended or adjusted under 35 U.S.C. 154(b) by 341 days.

(21) Appl. No.: 11/790,623

(22) Filed: Apr. 26, 2007

(65) Prior Publication Data

US 2008/0158484 A1     Jul. 3, 2008

(30) Foreign Application Priority Data

Dec. 28, 2006    (KR) .................. 10-2006-0136013

(51) Int. Cl.
*G02F 1/1335*    (2006.01)
*G02F 1/13*    (2006.01)

(52) U.S. Cl. .................. 349/117; 349/119; 349/196

(58) Field of Classification Search .................. None
See application file for complete search history.

(56) References Cited

U.S. PATENT DOCUMENTS

| | | | | |
|---|---|---|---|---|
| 6,028,656 A * | 2/2000 | Buhrer et al. | ............... | 349/196 |
| 6,462,724 B1 * | 10/2002 | Ozawa et al. | ................. | 345/87 |
| 6,707,515 B1 * | 3/2004 | Ide et al. | .................. | 349/74 |
| 6,831,711 B2 * | 12/2004 | Choi et al. | .................... | 349/74 |
| 7,468,769 B2 * | 12/2008 | Nakagawa | .................. | 349/117 |
| 7,495,719 B2 * | 2/2009 | Adachi et al. | ................ | 349/96 |

FOREIGN PATENT DOCUMENTS

| CN | 1550840 A | 12/2004 |
|---|---|---|
| CN | 1702517 A | 11/2005 |

* cited by examiner

*Primary Examiner*—Tina M Wong
(74) *Attorney, Agent, or Firm*—Hollan & Knight LLP

(57) ABSTRACT

The present invention relates to a viewing angle controllable liquid crystal display device. The purpose of the present invention is to provide a viewing angle controllable liquid crystal display device applied with TN mode LCD panel in which a narrow view angle mode is possible in bilateral symmetry. In order to achieve above mentioned purposes, the present invention comprises of: a first panel including a TN mode liquid crystal material having a lowest liquid crystal layer aligned to −45° direction from a lateral axis of the device and a upper most liquid crystal layer aligned to +45° direction from the lateral axis, and a upper polarizing plate disposing on the TN mode liquid crystal material and having a light transmission axis parallel to +45° direction from the lateral axis; a half wave plate disposing above the first panel and delaying a phase of light passing the first panel so that a polarization axis determined by the first panel is changed to perpendicular to the lateral axis; and a second panel disposing above the half wave plate, including ECB liquid crystal material and controlling a viewing angle in bilateral symmetry.

18 Claims, 19 Drawing Sheets

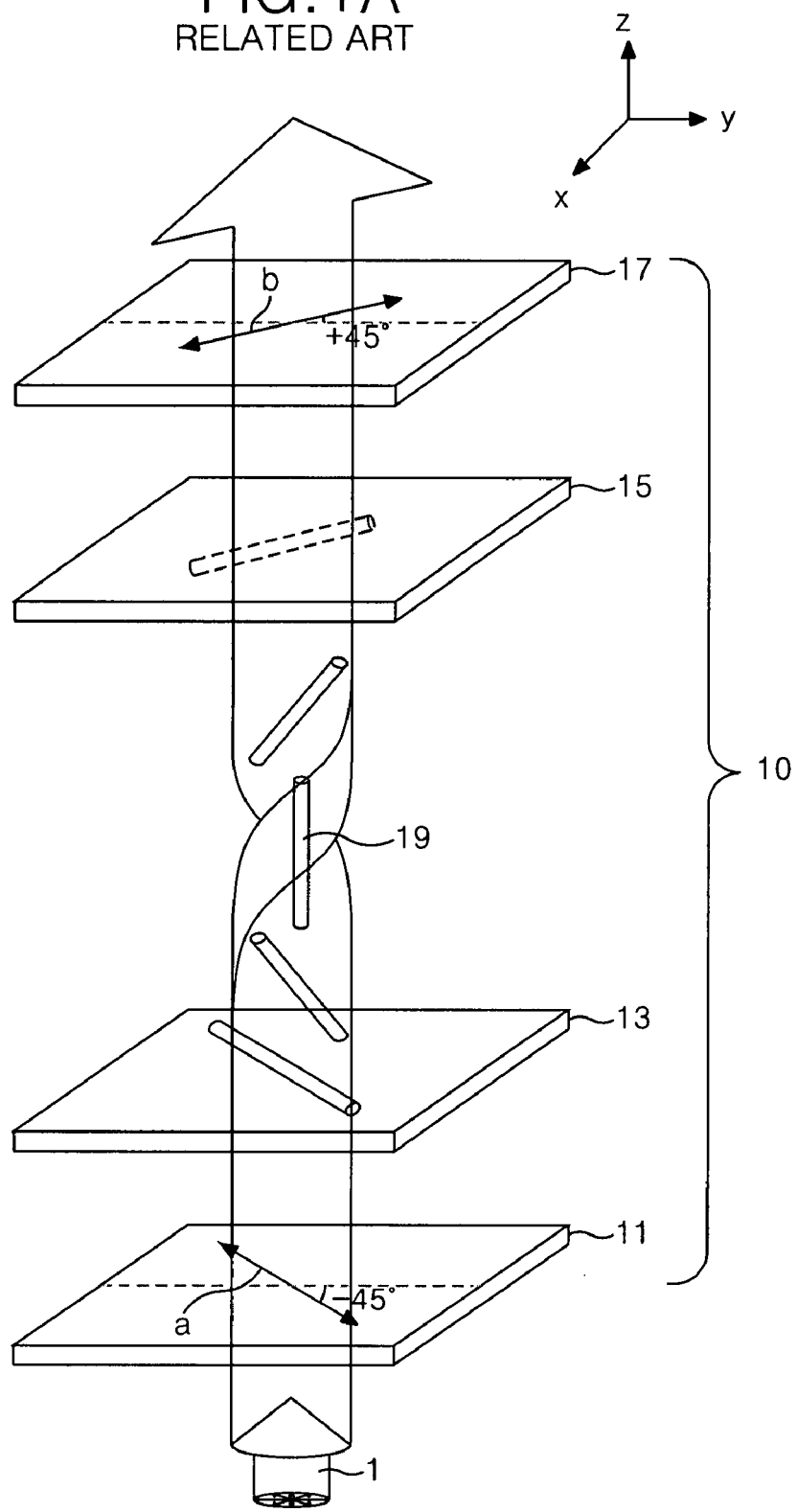

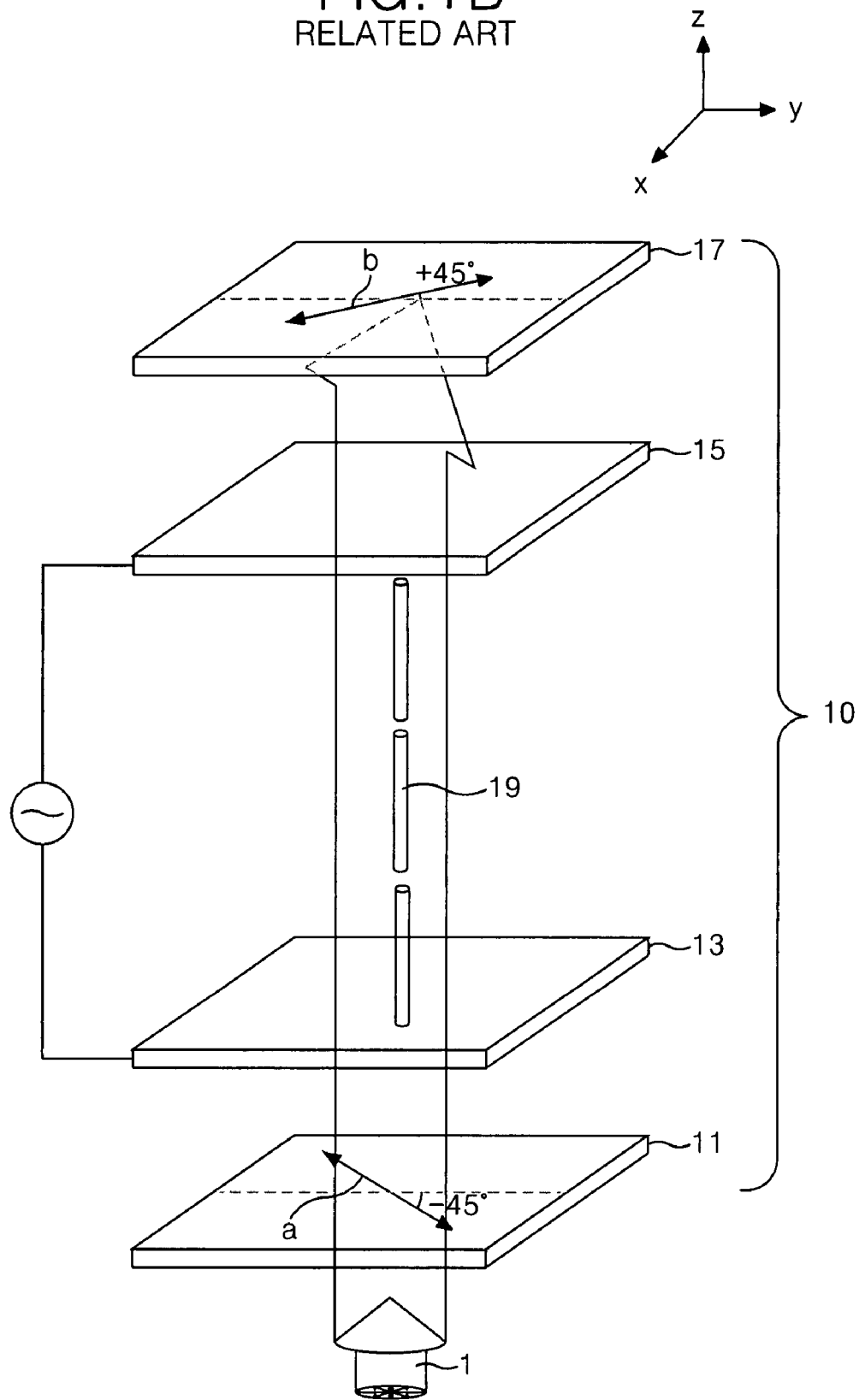

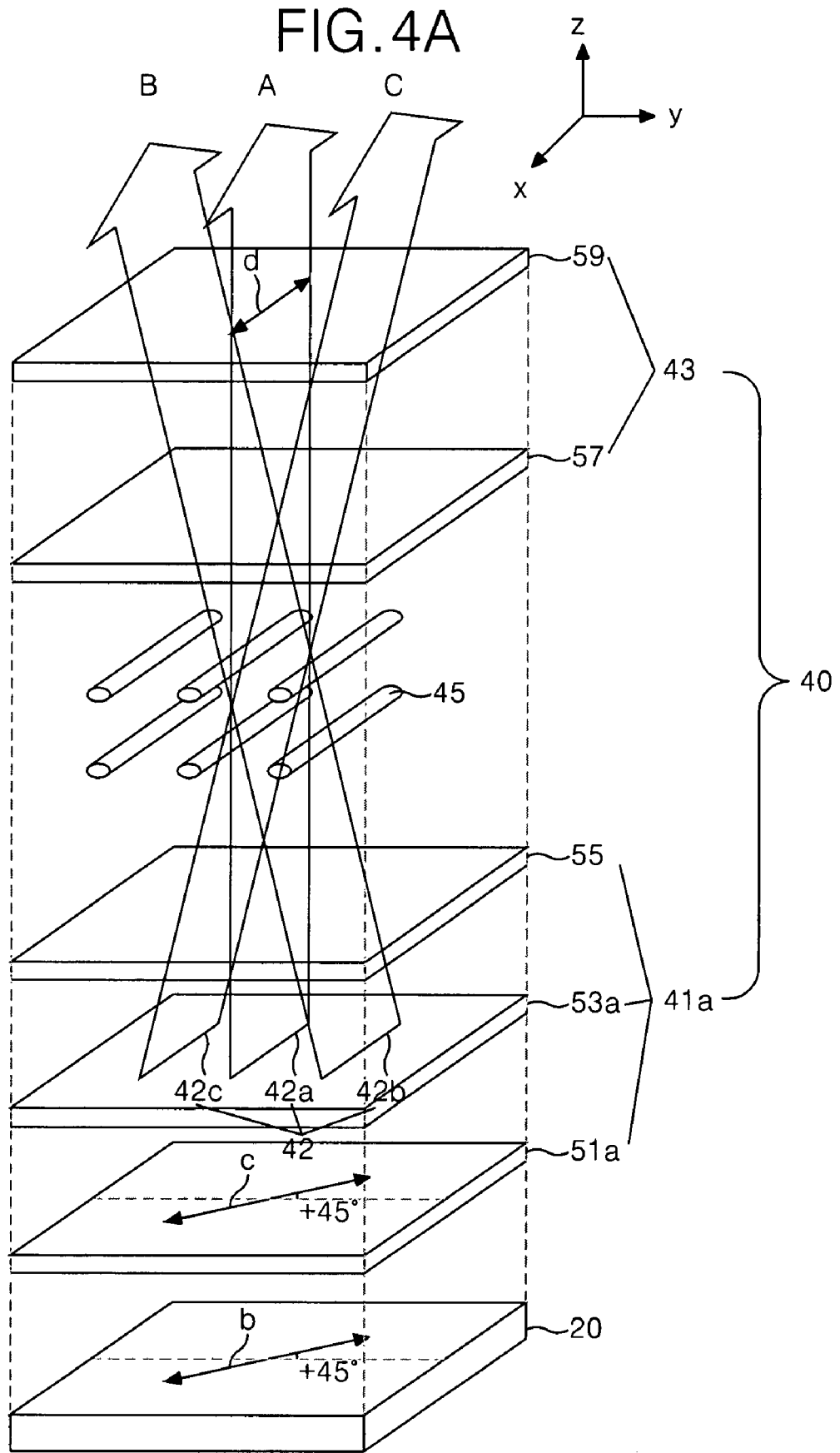

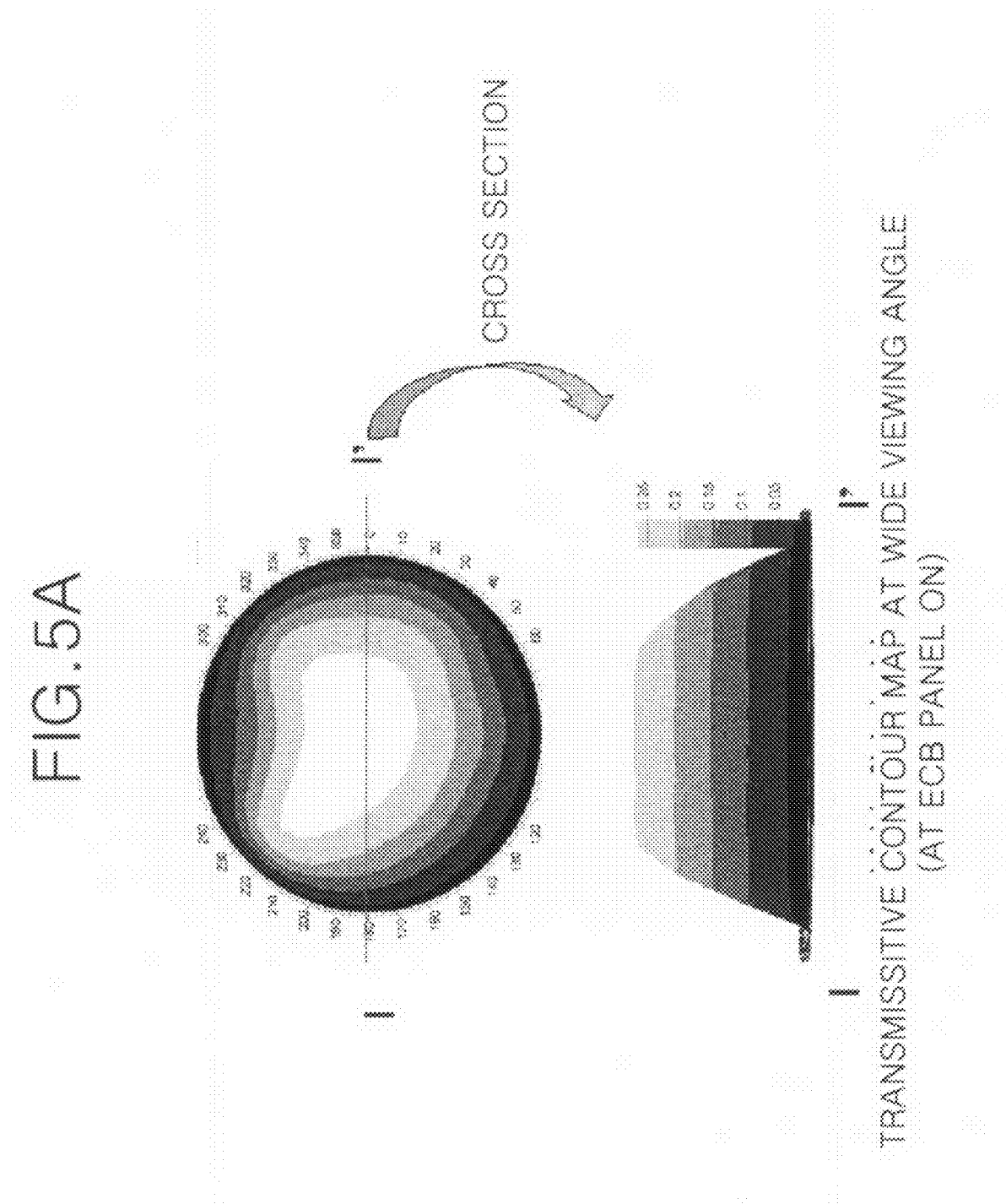

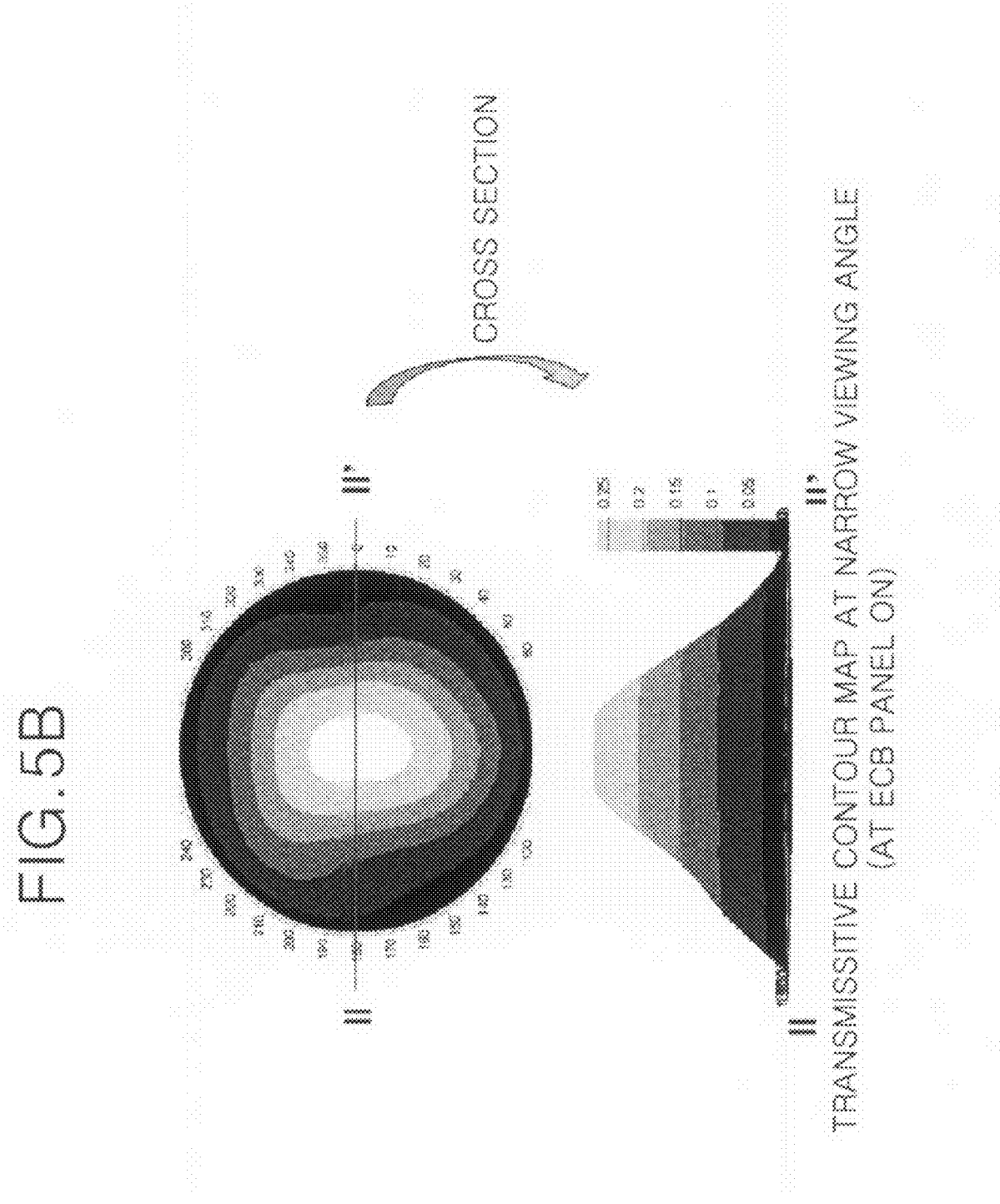

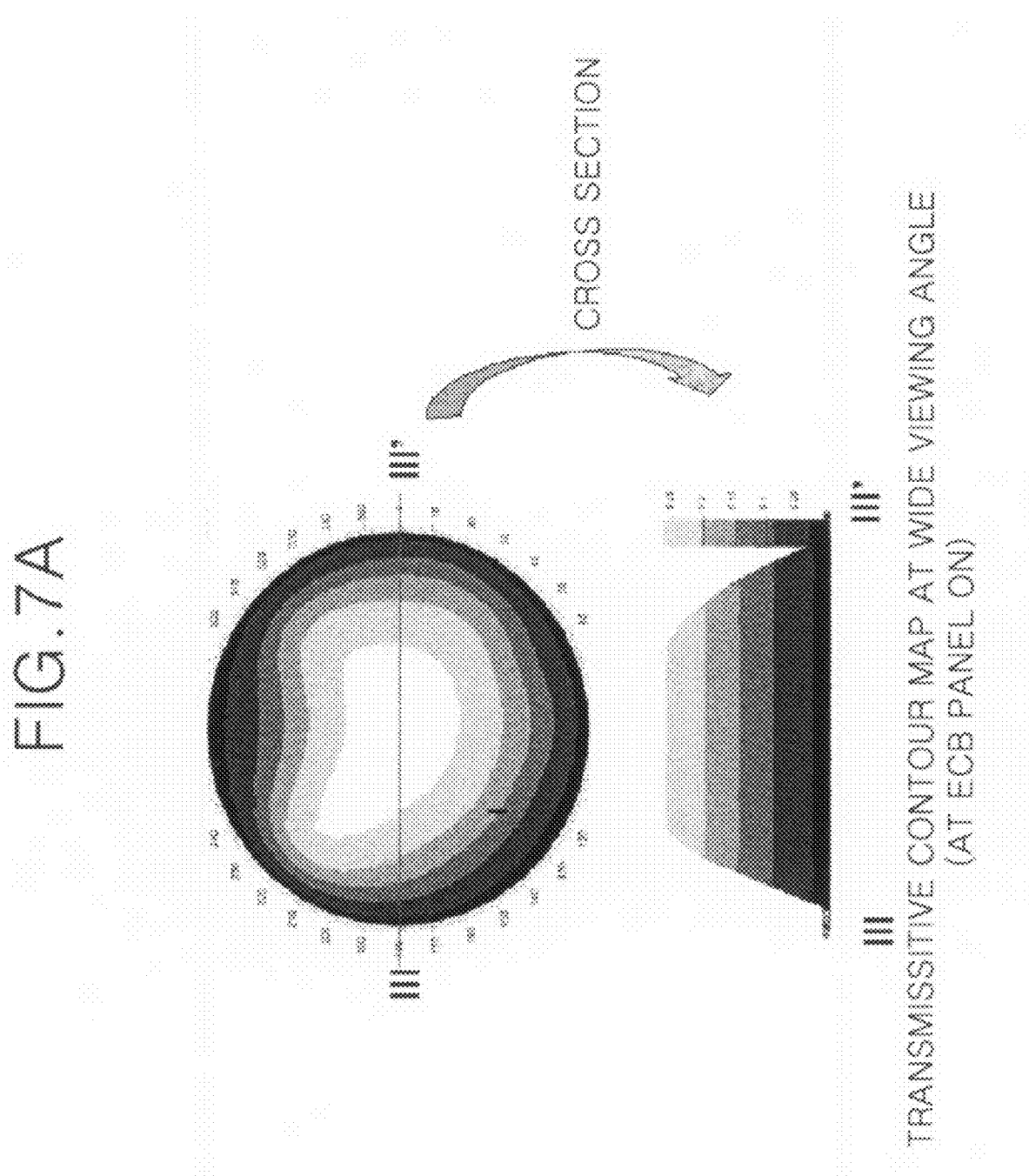

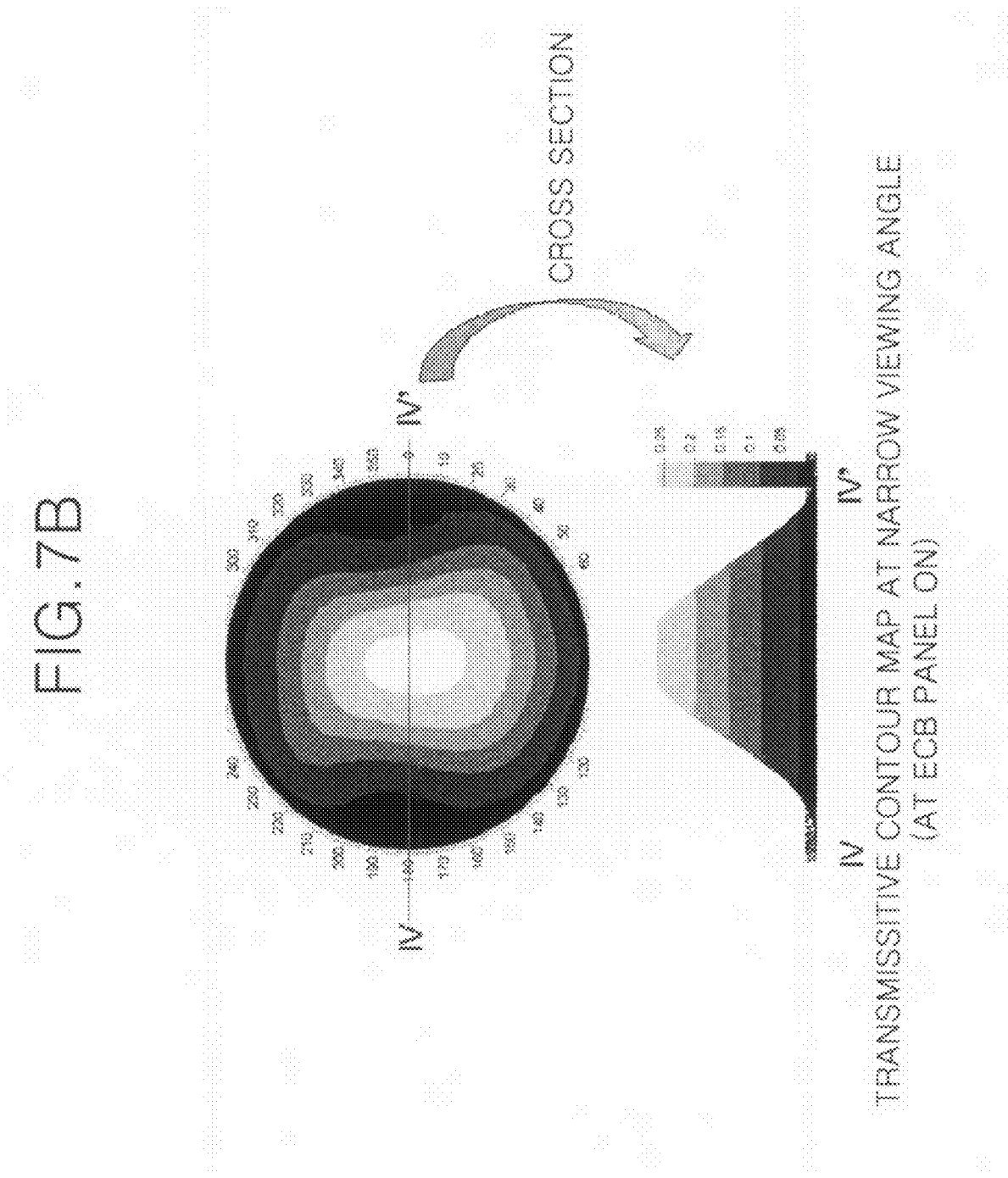

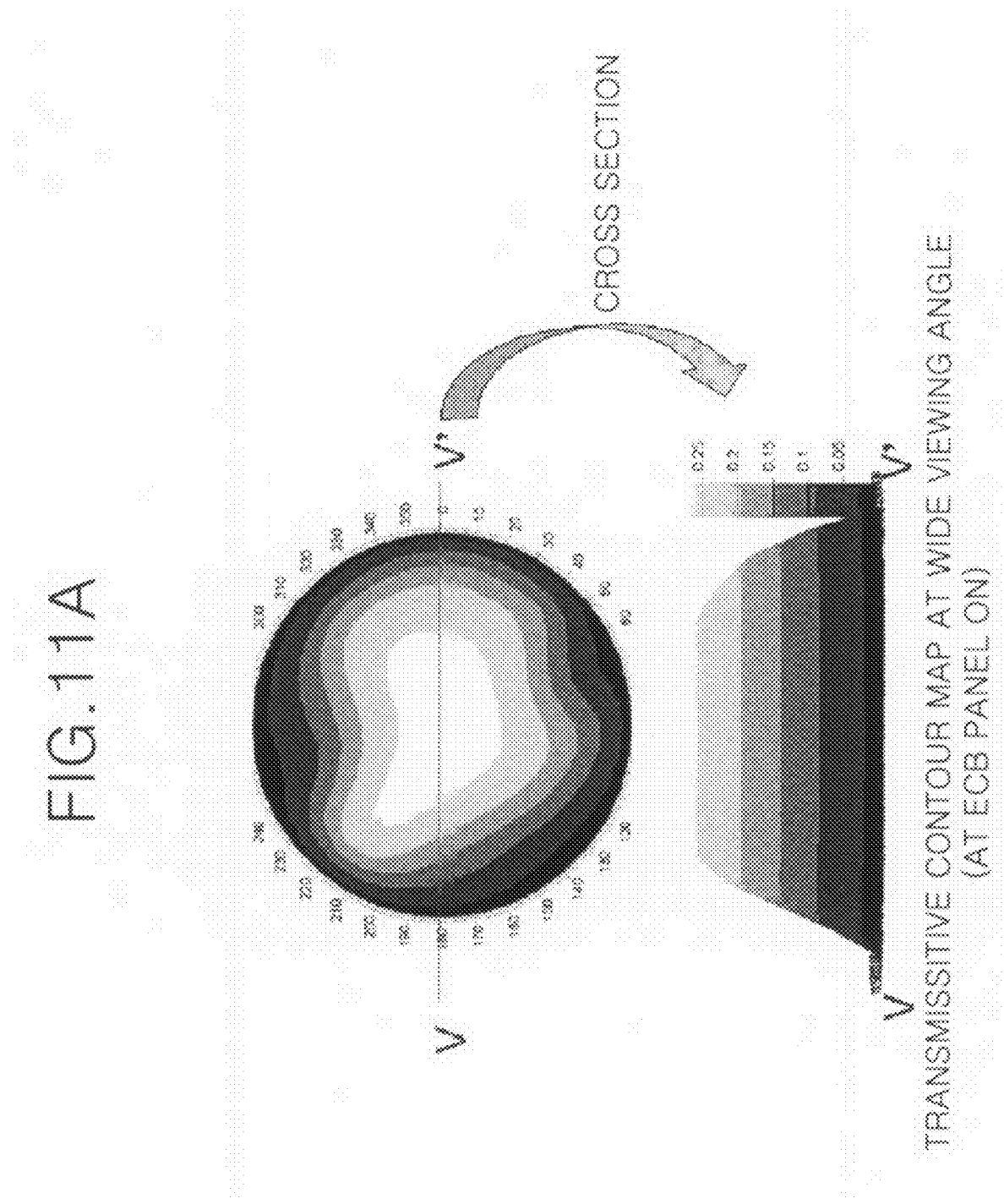

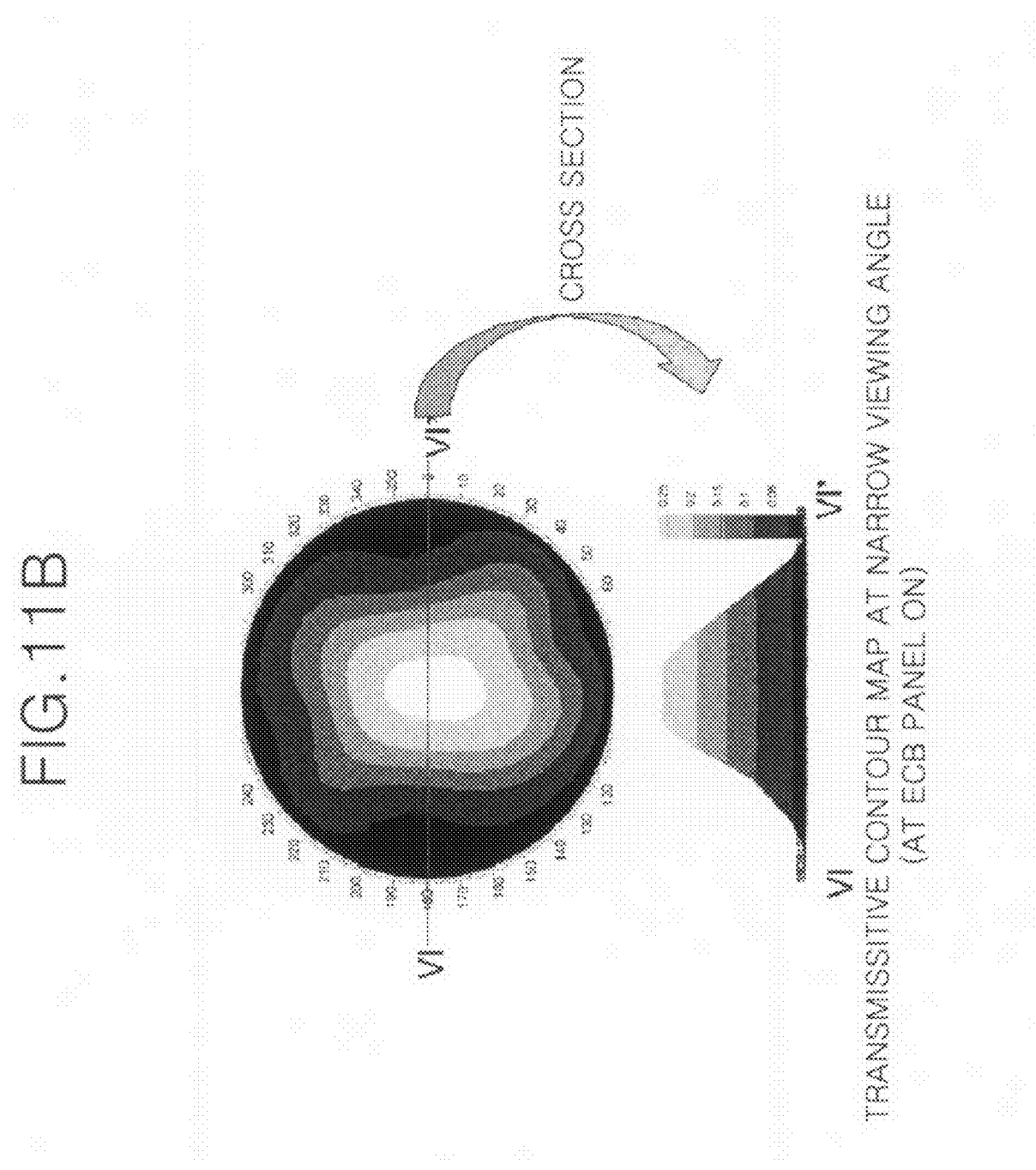

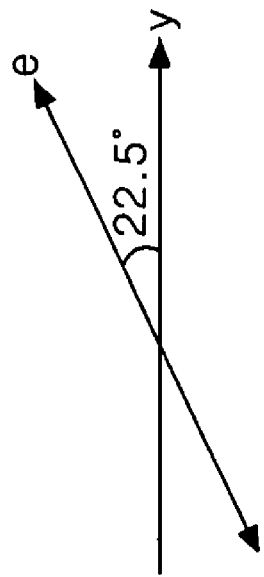
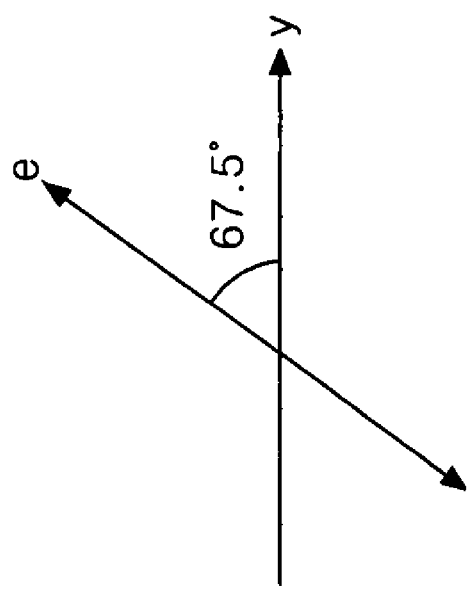
FIG.12 ically or in parallel to each other. A liquid
VIEWING ANGLE CONTROLLABLE LIQUID CRYSTAL DISPLAY DEVICE This invention claims the benefit of Korean Patent Application No. 10-2006-136013 filed on Dec. 28, 2006, which is hereby incorporated by in its entirety.

BACKGROUND OF THE INVENTION

1. Field of the Invention

Embodiments of the present invention relates to a liquid crystal display device, and more particularly, to a liquid crystal display (hereinafter, it is also called an "LCD") in which the viewing angle can be controlled.

2. Description of the Related Art

In general, a liquid crystal display device displays image by controlling optical transmittance of liquid crystal materials. An LCD includes liquid crystal cells arrayed in matrix, and an upper polarizing plate and a lower polarizing plate attached at both outer sides of the liquid crystal cell array in which the transmission axis of the two polarizing plates are disposed in perpendicular or in parallel to each other. A liquid crystal cell includes a liquid crystal material having a dielectric anisotropy and optical anisotropy characteristics. Further, the liquid crystal cell includes a pixel electrode and a common electrode for generating an electric field to drive the liquid crystal material. The pixel electrode is connected to a switching device, such as a thin film transistor (or "TFT"). The pixel and common electrodes can be disposed vertically or horizontally so that they can generate an electric field vertically or horizontally across the liquid crystal material. To generate a vertical electric field, the pixel and common electrodes are formed on different substrates that are facing each other with the liquid crystal material between them. To generate a horizontal electric field, the pixel and common electrodes are formed on the same substrate.

The TN (Twisted Nematic) mode, which has more merits in cost and manufacturing process, is typically used in the LCD device. The FIGS. 1A and 1B illustrate the structure of the TN mode LCD according to the related art. Referring to FIGS. 1A and 1B, the TN mode LCD 10 has an upper substrate having a common electrode 15 and an upper polarizing plate 17, a lower substrate having a pixel electrode 13 and a lower polarizing plate 11, and liquid crystal molecules 19 disposed in the cell gap between the upper substrate and the lower substrate. At an initial aligned state, the liquid crystal molecules 19 of the TN mode are stacked and arrayed with a continuous twist of 90° from the lower substrate (having the pixel electrode 13) to the upper substrate (having the common electrode 15). The upper polarizing plate 17 and the lower polarizing plate 11 are disposed such that their light transmission axes ('a' and 'b') are perpendicular each other.

The lower polarizing plate 11 plays the role of polarizing the incident light linearly. The liquid crystal molecules 19 change in their aligned or arrayed condition in response to the electric field generated between the common electrode 15 and the pixel electrode 13. As the aligned state of the liquid crystal molecules 19 is controlled, the linearly polarized light through the lower polarizing plate 11 can be controlled. The upper polarizing plate 17 plays role of transmitting the light linearly polarized in the same direction as the transmission axis of the upper polarizing plate 17.

As shown in FIG. 1A, when an electric field is not generated between the pixel electrode 13 and the common electrode 15, the liquid crystal molecules 19 maintain their initially aligned state. At this time, as the incident light 1 enters into LCD device 10 through the lower polarizing plate 11, the light components parallel to the transmission axis (a) of the lower polarizing plate 11 are passing through the lower polarizing plate 11 (linear polarization). And then, when the light passes through twisted liquid crystal materials 19, the phase is retarded so that the light linear polarization axis is rotated 90° so that it is parallel to the transmission axis (b) of the upper polarizing plate 15. Therefore, the light passing through the liquid crystal material 19 can pass through the upper polarizing plate 19 and light is presented on the screen of the LCD panel.

As shown in FIG. 1B, when a vertical electric field is generated between the pixel electrode 13 and the common electrode 15, the twisted structure of the liquid crystal materials 19 is broken by the dipole moment of the liquid crystal materials due to the applied electric field. The liquid crystal materials become aligned vertically in parallel with the electric field. At this time, an incident light 1, which is the light components parallel to the light axis (a) of the lower polarizing plate 11, is entering into the LCD. When the light components encounter the vertically aligned liquid crystal molecules 19, the polarizing state of the light components is maintained. Therefore, the light component encountering the liquid crystal molecules 19 remain polarized perpendicular to the light transmission axis (b) of the upper polarizing plate 17. As a result, light can not passes the upper polarizing plate 17 and black image is presented on the screen of LCD panel.

In the TN mode, the initial aligned state of the liquid crystal molecules 19 is that the lowest layer of the liquid crystal molecules 19 is parallel with the Y-axis of the plane of the LCD panel (when the LCD plane is corresponding to the X-Y plane of the rectangular coordinate system shown in FIGS. 1A and 1B), and the liquid crystal molecules in the next subsequent layer are twisted a little, the next layer are twisted a little more and so on with the rest of the layers of liquid crystal molecules. Finally, the liquid crystal molecules 19 in the upper most layers are parallel with the X-axis such that it is twisted 90° with respect to the lowest layer of liquid crystal molecules. In this case, the LCD device 10 has a gray inversion problem in which the contrast in the up, down, left and right viewing angles is inversed. To solve this problem in a typical LCD panel using TN mode liquid crystal material, the lowest liquid crystal molecules are aligned at a −45° direction from respect to the Y-axis of the LCD panel 10. From the lowest layer of liquid crystal molecules, the aligned directions of the liquid crystal molecules in the layers of liquid crystal molecules are twisted continuously to 90° as the layers go upward so that the aligned direction of the liquid crystal molecules in the upper most layer is aligned at +45° with respect to the Y-axis of the LCD panel 10. This is determined by considering that the most users of LCD panel are seeing the panel from the 6 o'clock direction of the panel. In accordance with the alignment direction of the TN mode liquid crystal molecules 19, the transmission axis of the upper polarizing plate 17 should be disposed at +45° with respect to the Y-axis of the LCD panel 10. Here, the Y-axis is generally the lateral direction (long axis) of the LCD panel 10.

Most LCD devices including TN mode LCD panel 10 are developed to have wide viewing angle so users can see the normal display information of the screen from any viewing angle. However, some fields, such as banking or personal information conveyance, the viewing angle should be narrow in range or controlled to be narrow in range. Therefore, hybrid types viewing devices in which user can select the viewing angle according to the using environment or purpose have been developed.

Currently, a viewing angle controllable LCD device includes an LCD panel (also called as 'Screen Panel') and a viewing angle controllable LCD (also called as 'View Angle Panel') attached thereon. The view angle panel controls the viewing angle of the display information from the screen panel. For example, when the view angle panel is not activated by an electric field, the viewing angle controllable LCD operates in the wide viewing angle mode so that user can see normal screen data in any direction of front of the LCD device. However, when an electric field is applied to the view angle panel, the viewing angle controllable LCD is operates to narrow the viewing angle mode of the LCD panel so that only the user right front of the LCD panel can see screen data.

The viewing angle controllable LCD device should control the viewing angle in bilateral symmetry for the most effective viewing control quality. However, as explained in above, a TN mode LCD panel 10 typically has polarizing plates with transmission axis that are at +45° and −45° to the Y-axis, respectively. Therefore, the light past through from the TN mode liquid crystal molecules is polarized to at +45° direction to the Y-axis. As a result, the view angle panel can not control the viewing angle of the polarized light by the TN mode LCD panel with bilateral symmetry. In other words, for an initial state of a TN mode LCD panel in which the transmission axis of the polarizing plates are aligned at 0° and 90° with respect to the Y-axis, it might be possible to make bilateral symmetry viewing angle controllable LCD using TN mode LCD. If it was, the gray inversion problem would not be solved. For this reason, a viewing angle controllable LCD device for a TN mode LCD, which does not have the gray inversion problem, has not been developed.

SUMMARY OF THE INVENTION

Accordingly, embodiments of the invention are directed to a viewing angle controllable liquid crystal display device that substantially obviates one or more of the problems due to limitations and disadvantages of the related art.

An object of embodiments of the invention is to provide a viewing angle controllable liquid crystal display device for a TN mode LCD panel that does not have gray inversion at side viewing angles.

An object of embodiments of the invention is to provide a viewing angle controllable LCD device for a TN mode LCD panel in which the view angle can be controlled with bilateral symmetry.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a viewing angle controllable LCD device includes a first panel including a TN mode liquid crystal material having a lowest liquid crystal layer aligned to −45° direction from a lateral axis of the device and a upper most liquid crystal layer aligned to +45° direction from the lateral axis, and a upper polarizing plate disposing on the TN mode liquid crystal material and having a light transmission axis parallel to +45° direction from the lateral axis; a half wave plate disposing above the first panel and delaying a phase of light passing the first panel so that a polarization axis determined by the first panel is changed to perpendicular to the lateral axis; and a second panel disposing above the half wave plate, including ECB liquid crystal material and controlling a viewing angle in bilateral symmetry.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings:

FIGS. 1A and 1B illustrate the structure of a TN mode liquid crystal display device according to the related art;

FIGS. 4A and 4B illustrate the wide view angle mode and the narrow view angle mode of a viewing angle controllable liquid crystal display device according to the first embodiment of the present invention;

FIGS. 5A and 5B illustrate the light transmissitive characteristic graph in wide view angle mode and narrow view angle mode of a viewing angle controllable liquid crystal display device shown in the FIGS. 4A and 4B;

FIGS. 7A and 7B illustrate the light transmissitive characteristic graph in wide view angle mode and narrow view angle mode of a viewing angle controllable liquid crystal display device shown in the FIGS. 6A and 6B;

FIGS. 11A and 11B illustrate the light transmissive characteristic graph in wide view angle mode and narrow view angle mode of a viewing angle controllable liquid crystal display device shown in the FIGS. 10A and 10B; and FIG. 12 illustrates the light axis of the half wave plate shown in FIGS. 4A to 10B.

DETAILED DESCRIPTION OF THE PREFERRED EMBODIMENTS

The purposes and advantages of the present invention will be described through the preferred embodiment of the present invention with reference to the attached drawings from FIG. 2 to FIG. 12. Embodiments of the present invention include a half wave plate for rotating the linear polarizing direction by 45° further from the lateral direction of the substrate so that the polarizing direction is perpendicular to the lateral direction of the substrate. This half wave plate can be disposed between the TN mode liquid crystal material of the Screen Panel and the ECB mode liquid crystal material of the View Angle Panel. Referring to the relevant figures, the preferred embodiments according to the present invention will be explained in detail.

Figure 2:
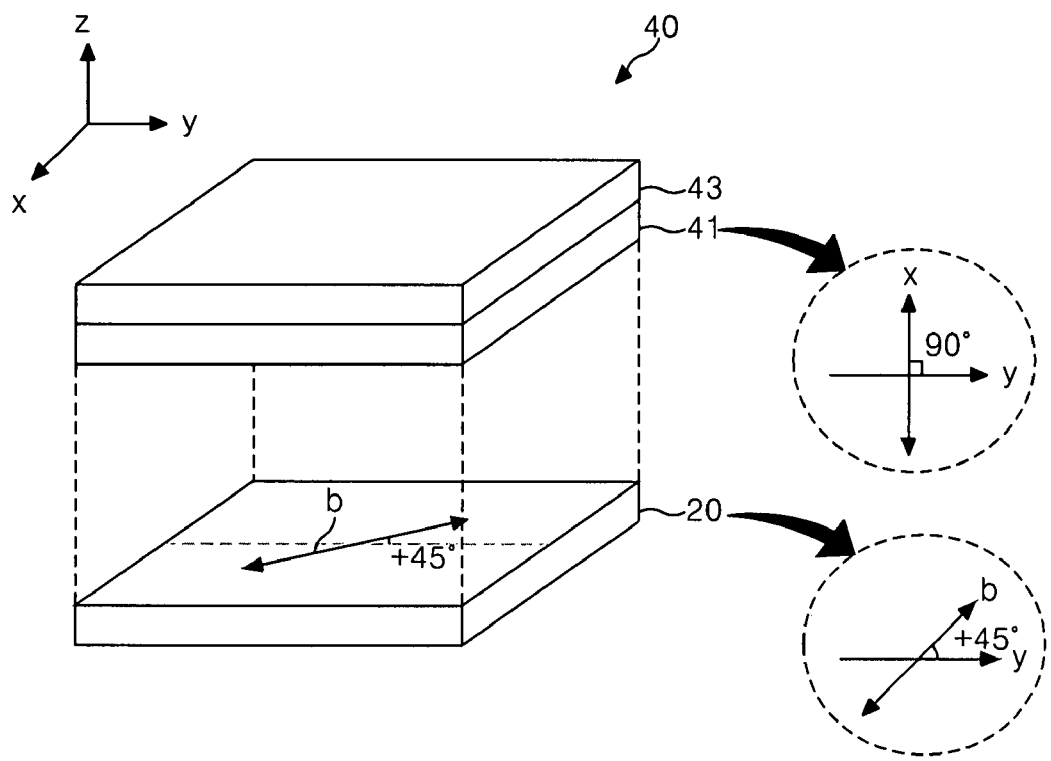
FIG. 2 illustrates a structure of a viewing angle controllable liquid crystal display device according to first and second embodiments of the present invention.

FIG. 2 illustrates a structure of a viewing angle controllable liquid crystal display device according to first and second embodiments of the present invention. Referring to FIG. 2, a viewing angle controllable LCD of embodiments of the present invention device includes a first panel 20 having a TN mode liquid crystal device and a second panel 40 selectively controlling the view angle of the picture presented from the first panel 20.

Figure 3:
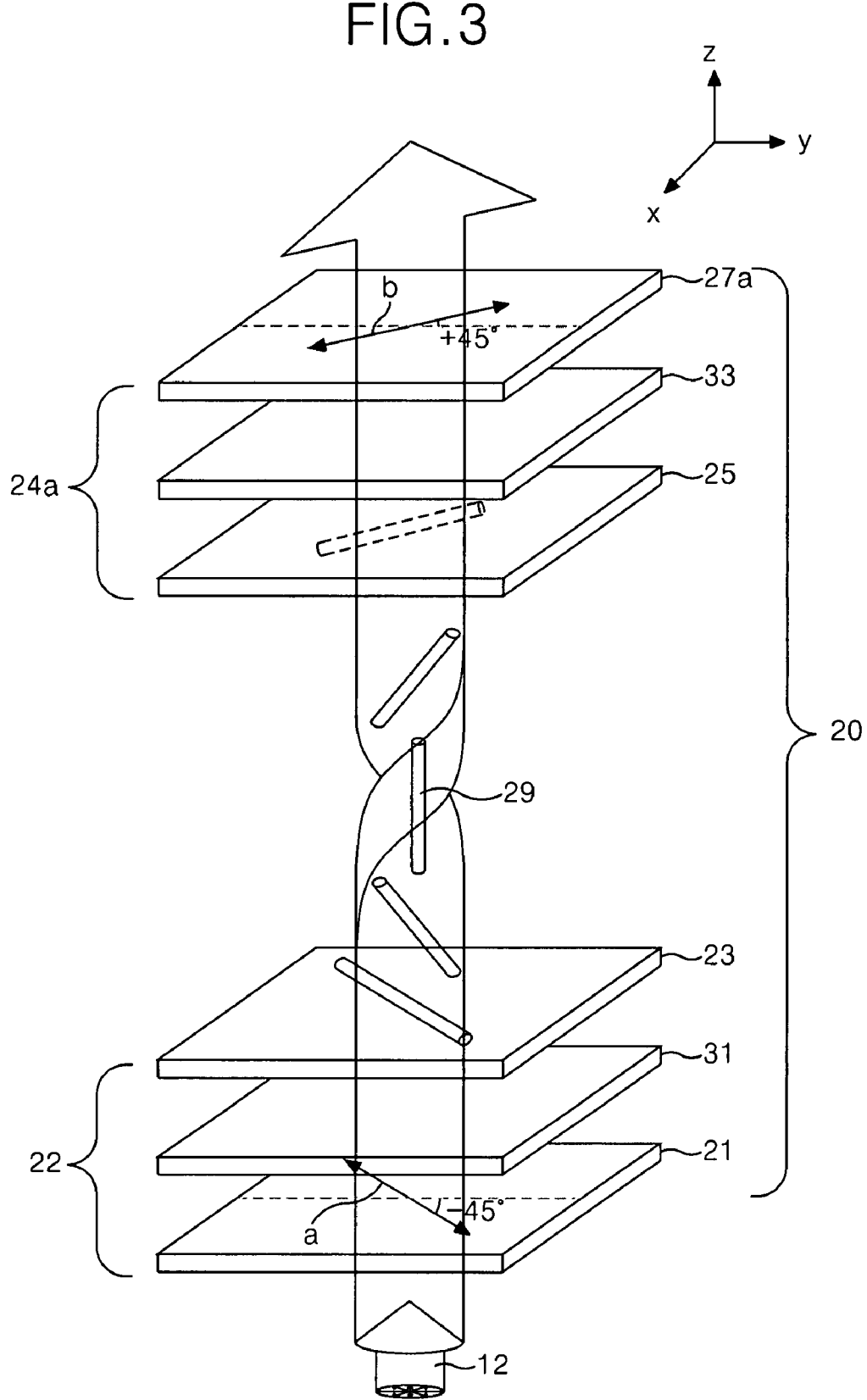
FIG. 3 illustrates the displaying principle of the liquid crystal display device shown in FIG. 2.

FIG. 3 illustrates the displaying principle of the liquid crystal display device shown in FIG. 2. Referring to FIG. 3, the first panel 20 includes an upper plate 24a having a common electrode 25 and a upper polarizing plate 27a, a lower plate 22 having a pixel electrode 23 and a lower polarizing plate 21, and liquid crystal molecules 29 positioned between the upper plate 24a and the lower plate 22. At an initial state, the liquid crystal molecules 29 of the first panel 20 are stacked as several layers such that the molecules of layers are twisted continuously 90° from the lowest layer to the upper most layer.

In the first and second embodiments of the present invention, the upper polarizing plate 27a and the lower polarizing plate 21 are arranged such that the light transmission axes ('a' and 'b') are perpendicular each other. To prevent the gray inversion problem, the lowest layer of the liquid crystal material 29 of the first panel 20 is aligned at −45° with respect to the Y-axis. The other layers of the liquid crystal molecules 29 are stacked with a continuous or helical twist. The upper most layers of the liquid crystal molecules 29 are aligned at a +45° direction with respect to the Y-axis. The Y-axis is parallel with the lateral direction of the Viewing Angle Panel. Therefore, the lower polarizing plate 21 is disposed so that its light transmission axis is parallel with the alignment direction of the lowest layer of the liquid crystal molecules 29. That is, the light transmission axis (a) is disposed at a −45° with respect to the Y-axis. In addition, the upper polarizing plate 27a is disposed so that its light transmission axis is parallel with the alignment direction of the upper most layer of the liquid crystal material 29. That is, the light transmission axis (b) is disposed at a +45° direction with respect to the Y-axis.

When an electric field is not applied between the pixel electrode 23 and the common electrode 25, the liquid crystal molecules 29 maintain their initial alignment state. During this condition, the light 12 incident to the first panel 20 at the lower polarizing plate 21 is linearly polarized because the light component parallel to the light transmission axis (a) can pass through the lower polarizing plate 21. As the linearly polarized light is passing through the twisted layers of liquid crystal molecules 29, the polarizing direction is changed by 90°. The polarizing direction of the light that has past through the liquid crystal molecules 29 changes to be parallel with the light transmission axis (b) of the upper polarizing plate 27a. As a result, the linearly polarized light of the lower polarizing plate 21 can pass through the upper polarizing plate 27a. The polarizing direction of the light passing through the upper polarizing plate 27a is parallel to the +45° direction with respect to the Y-axis or lateral axis.

The linearly polarized light at +45° with respect to the Y-axis passes through the first panel 20 and then enters into the second panel 40. The lower plate 22 of the first panel 20 can also include an optical film 31 between the pixel electrode 23 and the lower polarizing plate 21 to enhance optical properties of the light passing through the lower plate 22. The upper plate 24a of the first panel 20 can also include an optical film 33 between the common electrode 25 and the upper polarizing plate 27a for enhancing optical properties of the light passing through the upper plate 24a.

The second panel 40 includes an upper plate 43, a lower plate 41 and ECB (Electrically Controlled Birefringence) liquid crystal molecules 45 positioned between the upper plate 43 and the lower plate 41. The ECB liquid crystal molecules 45 phase retards the light in an effective directions. However, these effective directions are not parallel or perpendicular to the major axis of the liquid crystal material. Accordingly, the second panel 40 controls the viewing angle using this property of the ECB liquid crystal molecules 45.

Controlling the viewing angle determines whether or not a person who is located at a side angle of the monitor sees the data shown on the monitor. In the wide viewing angle mode, people sitting at viewing angle of the monitor can see the data on the monitor. In the narrow viewing angle mode, only a person sitting right in front of the monitor can see the data and any other people viewing from a side viewing angel can not see the data on the monitor. Therefore, to control the view angle effectively with the ECB liquid crystal molecules 45, the viewing angle control should be performed with bilateral symmetry. To do so, the light incident to the ECB liquid crystal material should be polarized vertically, that is perpendicular to the Y-axis or lateral direction of the display panel. In embodiments of the present invention, the light linearly polarized at 45° with respect to the Y-axis after passing through the first panel 20 should be reoriented to be polarized at 90° with respect to the Y-axis before entering into the ECB liquid crystal material of the second panel 40. To do so, the present invention includes a half-wave plate 51a.

The half-wave plate changes the polarizing direction of incident light by 45° with respect to its initial polarizing direction. Therefore, light polarized at +45° with respect to the Y-axis passes through the first panel 20 so as to become polarized to a 90° with respect to the Y-axis by passing the lower plate of the second panel 40. After that, the light polarized at a 90° direction with respect to the Y-axis can be controlled with bilateral symmetry. Referring to FIGS. 4A, 4B, 6A, 6B, 10A and 10B, the structure of the lower panel of the second panel 40 will be explained for different embodiments.

Figure 4B:
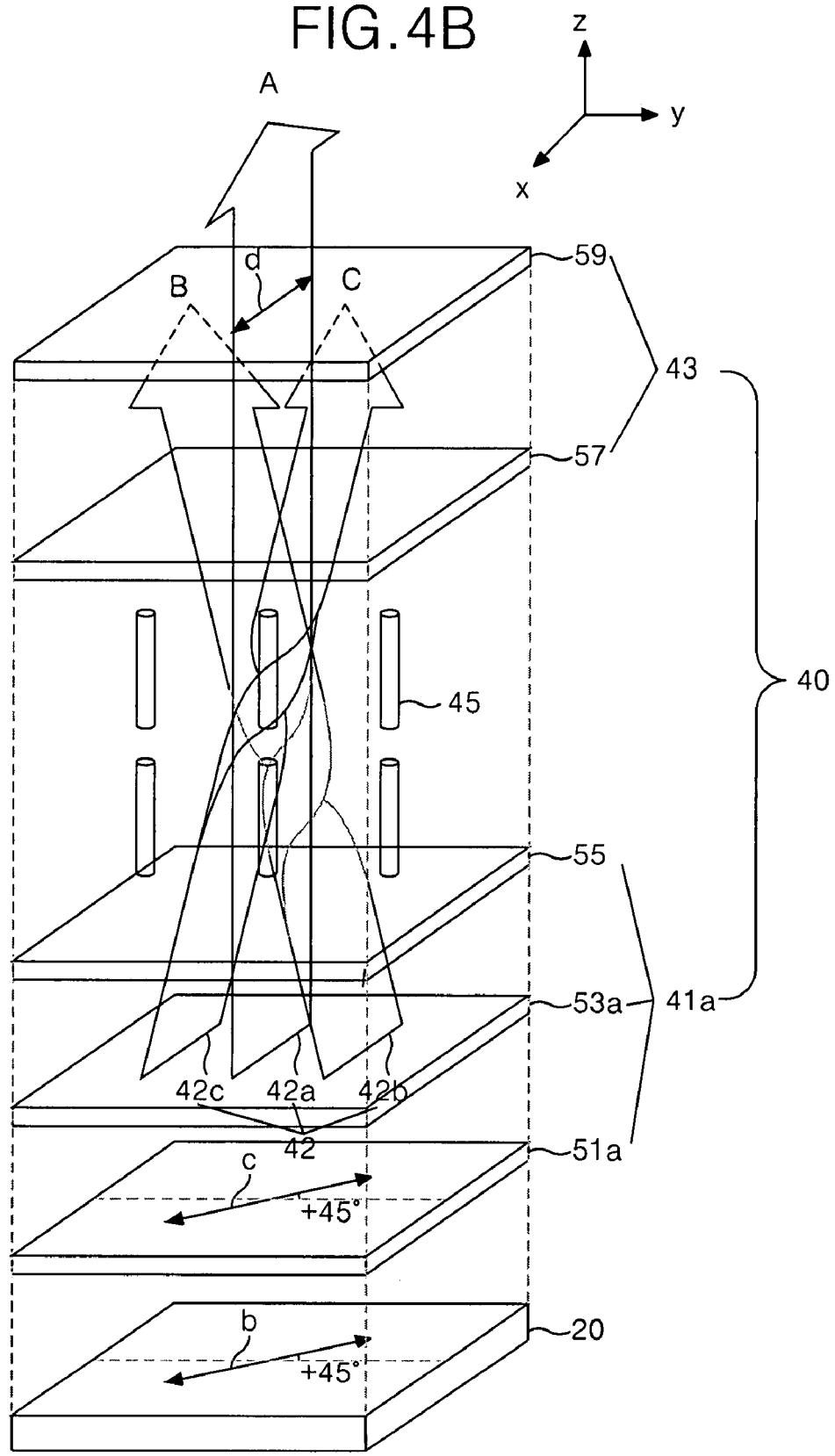

FIGS. 4A and 4B illustrate the wide viewing angle mode and the narrow viewing angle mode in the viewing angle controllable LCD device according to the first embodiment of the present invention. Referring to FIGS. 4A and AB, the second panel 40 according to the first embodiment includes an upper plate 43 having an upper polarizing plate 59 and a first electrode 57, a lower plate 41a having a lower polarizing plate 51a and a second electrode 55, and ECB liquid crystal molecules 45 positioned between the upper plate 43 and the lower plate 41a. The upper polarizing plate 59 is disposed such that its light transmission axis (d) is parallel with the major axis of the ECB liquid crystal molecules 45 in an initial state to pass the light passing through the ECB liquid crystal molecules 45. Further, the lower plate 41a of the second panel 40 includes a half wave plate 53a on the lower polarizing plate 51a. In the first embodiment, the light transmission axis (c) of the lower polarizing plate 51a is parallel with the light transmission axis (b) of the upper polarizing plate 27a of the first panel 20 for the light past the first panel 20 to be incident onto the half wave plate 53a. That is, the light passing through the lower polarizing plate 51a of the second panel 40 is at +45° with respect to the Y-axis. This linearly polarized light passing the half wave plate 53a changes its polarization direction by rotating 45° more. As a result, the resultant light is at 90° with respect to the Y-axis such that the resultant light is parallel to the X-axis, as shown in FIGS. 4A and 4B. The resultant linearly polarized light parallel with the X-axis enters into the ECB liquid crystal molecules 45. Initially, the ECB liquid crystal molecules 45 is aligned with the polarizing axis of resultant linearly polarized light from the half wave plate 53a. That is, the major axis of the ECB liquid crystal molecules 45 is aligned at 90° with respect to the Y-axis or lateral axis. The initial alignment state of the ECB liquid crystal molecules 45 is changed when an electric field is applied between the first electrode 57 and the second electrode 55. In the first embodiment, the second panel 40 includes the lower polarizing plate 51a. However, the lower polarizing plate 51a only ensures the linear polarization direction of the incident light on the half wave plate 53a. Therefore, the lower polarizing plate 51a is not necessarily required for the main function of the second panel 40.

When an electric field is not applied between the first electrode 57 and the second electrode 55, the ECB liquid crystal molecules 45 maintain its initial alignment state, as shown in FIG. 4A. In the initial state, the polarizing axis of the light from the half wave plate 53a is parallel with the aligned direction of the major axis of the ECB liquid crystal molecules 45. The light 42a traveling to the right front direction (Z-axis) of the viewing angle controllable display device has a polarized direction parallel with the major axis of the ECB liquid crystal molecules 45. Therefore, the light 42a can transmit the light transmission axis (d) of the upper polarizing plate 59 so as to be shown to an observer (A) in the front of the display device. In addition, the light 42b or 42c traveling to side viewing angles also has a polarized direction parallel with the major axis of the ECB liquid crystal molecules 45. Therefore, the light 42b or 43c can transmit through the light transmission axis (d) of the upper polarizing plate 59 and is shown to observers at the sides (B or C). As a result, all lights 42 through the half wave plate 53a are shown for all viewing angles. Accordingly, when the second panel 40 is turned off, the ECB liquid crystal molecules 45 maintain the initial alignment condition. The viewing angle controllable liquid crystal display device is operated in the wide view angle mode.

On the contrary, when an electric field is applied between the first electrode 57 and the second electrode 55 of the second panel 40, the ECB liquid crystal molecules 45 is rearranged along with the electric field direction so that the major axis is vertically raised up, as shown in FIG. 4B. Then, only the light 42a traveling right to the front direction (Z-axis) of the viewing angle controllable display device has the polarized direction perpendicular to the major axis of the ECB liquid crystal molecules 45. Therefore, the polarized light 42a is not affected by the ECB liquid crystal molecules 45. In that case, the light 42a can transmit through the light transmission axis (d) of the upper polarizing plate 59 and be shown to an observer (A) at the front viewing angle. However, the light 42b or 42c traveling to side viewing angles has polarized directions that are not parallel or vertical to the major axis of the ECB liquid crystal molecules 45. Therefore, the phase of the lights 42b or 43c is retarded by the ECB liquid crystal molecules 45 so that the polarizing direction is changed. As a result, the lights 42b or 43c can not transmit through the light transmission axis (d) of the upper polarizing plate 59 and thus are not shown to observers (B or C) at side angles. That is, when the second panel 40 is turned on, the ECB liquid crystal molecules 45 is aligned vertical to the surface of the panel 40. The viewing angle controllable liquid crystal display device is operated in a narrow view angle mode.

FIGS. 5A and 5B are contour maps illustrating the trasmissitive characteristics of the wide viewing angle mode and the narrow viewing angle mode in the viewing angle controllable liquid crystal display device of FIGS. 4A and 4B, respectively. The second panel according to the first embodiment controls the viewing angle of the polarized light at 90° with respect to the Y-axis by the half wave plate included in the second panel. Therefore, it is possible to control the viewing angle with bilateral symmetry. The viewing angle controllable device according to the first embodiment can provide a narrow viewing angle mode with bilateral symmetry.

Next, the second embodiment will be explained. The basic concept of the second embodiment is somewhat similar to that of the first embodiment. The second embodiment considers the manufacturing process in which the first panel and the second panel are provided as modules, and they are jointed with a half wave plate between them.

Figure 6A:
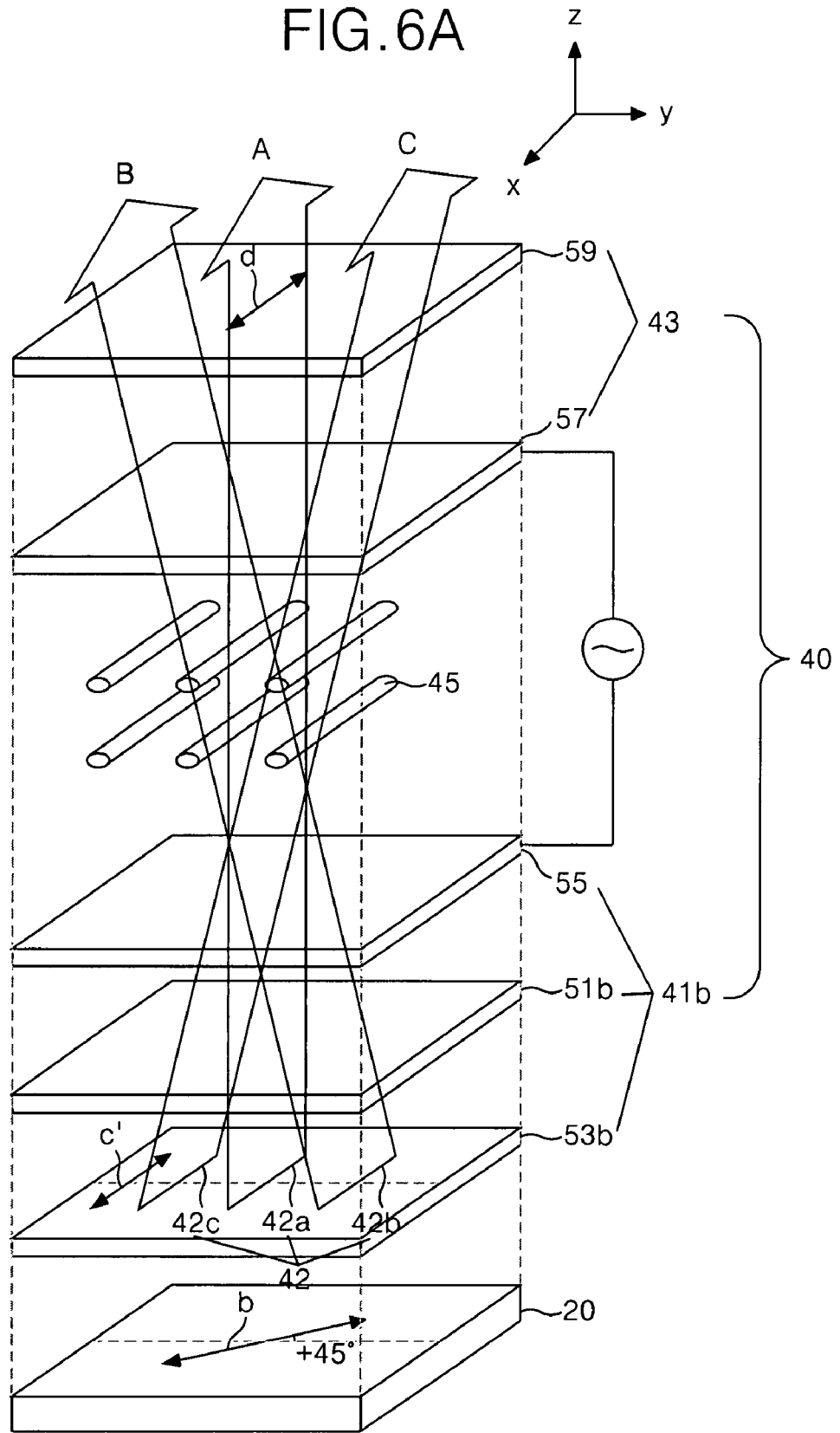
FIGS. 6A and 6B illustrate the wide view angle mode and the narrow view angle mode of a viewing angle controllable liquid crystal display device according to the second embodiment of the present invention.
Figure 6B:
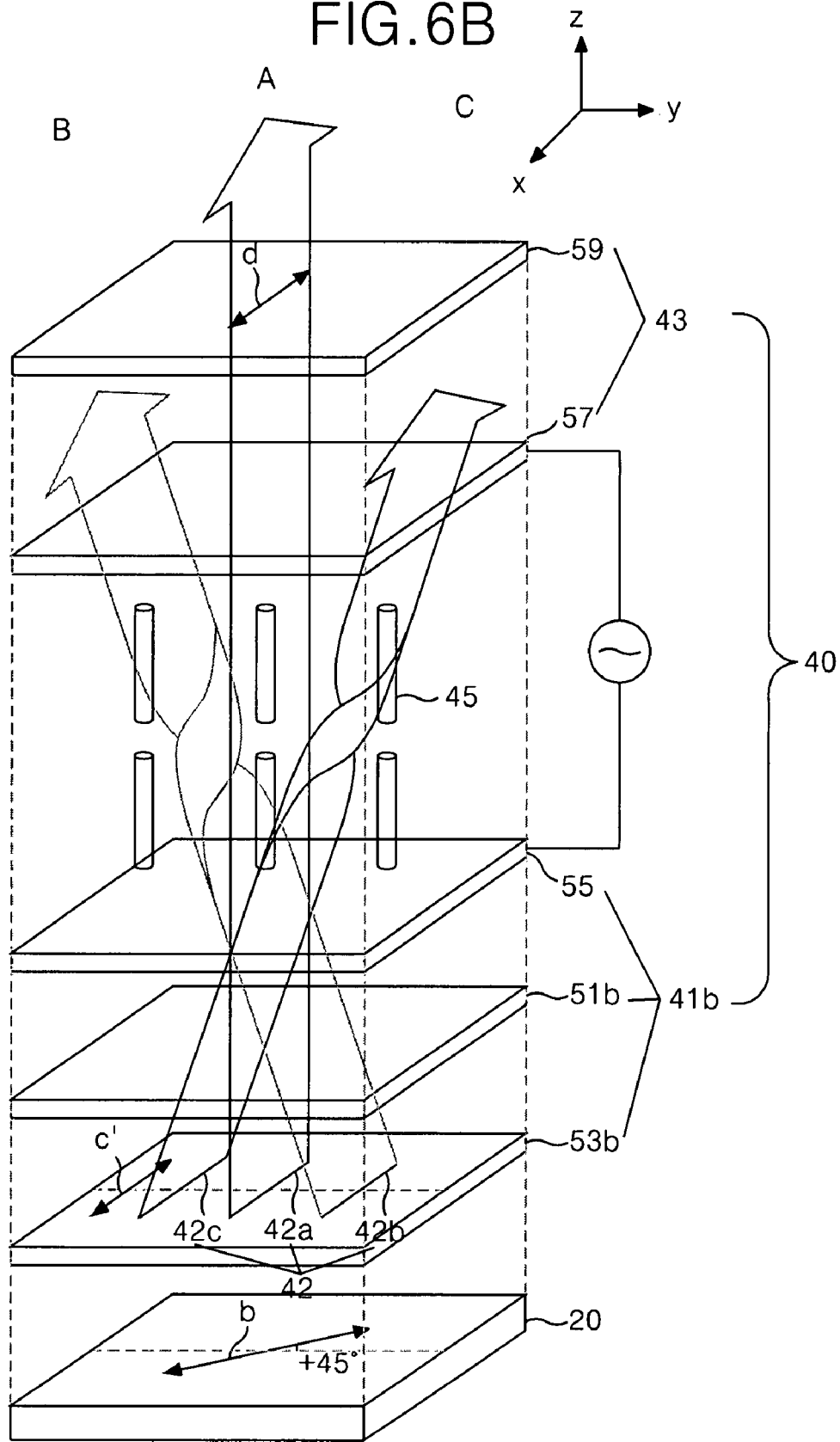

FIGS. 6A and 6B illustrate the wide viewing angle mode and the narrow viewing angle mode of the viewing angle controllable liquid crystal display device according to the second embodiment. Referring to FIGS. 6A and 6B, the second panel 40' includes an upper plate 43 having an upper polarizing plate 59 and a first electrode 57, a lower plate 41b having a lower polarizing plate 51b and a second electrode 55, and an ECB liquid crystal molecules 45 positioned between the upper plate 43 and the lower plate 41b. The light transmission axis (d) of the upper polarizing plate 59 is parallel with the major axis of the ECB liquid crystal molecules 45 to pass the light from the ECB liquid crystal molecules 45. The second panel 40' is joined with the first panel 20 in the first embodiment. Here, a half wave panel 53 is inserted between the first panel 20 and the second panel 40'. The half wave plate 53 changes the linear polarizing direction of the light at +45° with respect to the Y-axis from the first panel 20 to 90° with respect to the Y-axis. Therefore, the lower polarizing plate 51b of the second panel 40' should be disposed to have the light transmission axis parallel to the light axis linearly polarized by the half wave plate 53. However, the lower polarizing plate 51b is not necessarily required. The light transmission axis (c') of the lower polarizing plate 51b is aligned by considering the polarizing condition of the light after passing the half-wave plate 53b. For example, when the light is linearly polarized at +45° with respect to the Y-axis after passing through the first panel 20 and then passes through the half-wave plate 53, the polarizing direction is rotated 45° more so that the light becomes linearly polarized at 90° with respect to the Y-axis, as shown in FIGS. 6A and 6B. Therefore, the light transmission axis (c') of the lower polarizing plate 51b is set to be perpendicular to the Y-axis or lateral axis. Subsequently, the light passes through the lower polarizing plate 51b and then enters into the ECB liquid crystal molecules 45. Using the ECB liquid crystal molecules 45, the light can be controlled to be in a narrow viewing angle mode or in a wide viewing angle mode. The detail methods for the narrow and wide viewing angle modes are the same as described in FIGS. 4A and 4B so it will not be described again.

FIGS. 7A and 7B are the contour maps illustrating the trasmissitive characteristics of the wide viewing angle mode and the narrow viewing angle mode in the viewing angle controllable liquid crystal display device of FIGS. 5A and 5B, respectively. The second panel according to the second embodiment of the present invention controls the viewing angle of the light linearly polarized at 90° with respect to the Y-axis by the half-wave plate, so that it can be controlled with bilateral symmetry. The viewing angle controllable LCD device according to the second embodiment can accomplish the narrow viewing angle mode with bilateral symmetry, as shown in FIG. 7B. In the second embodiment, the lower polarizing plate 51b of the second panel 40' can be removed for the same reason as in the first embodiment.

The concept of the third embodiment is somewhat similar to the first and second embodiments. The difference is that the half wave plate is included when the first panel is manufactured.

Figure 8:
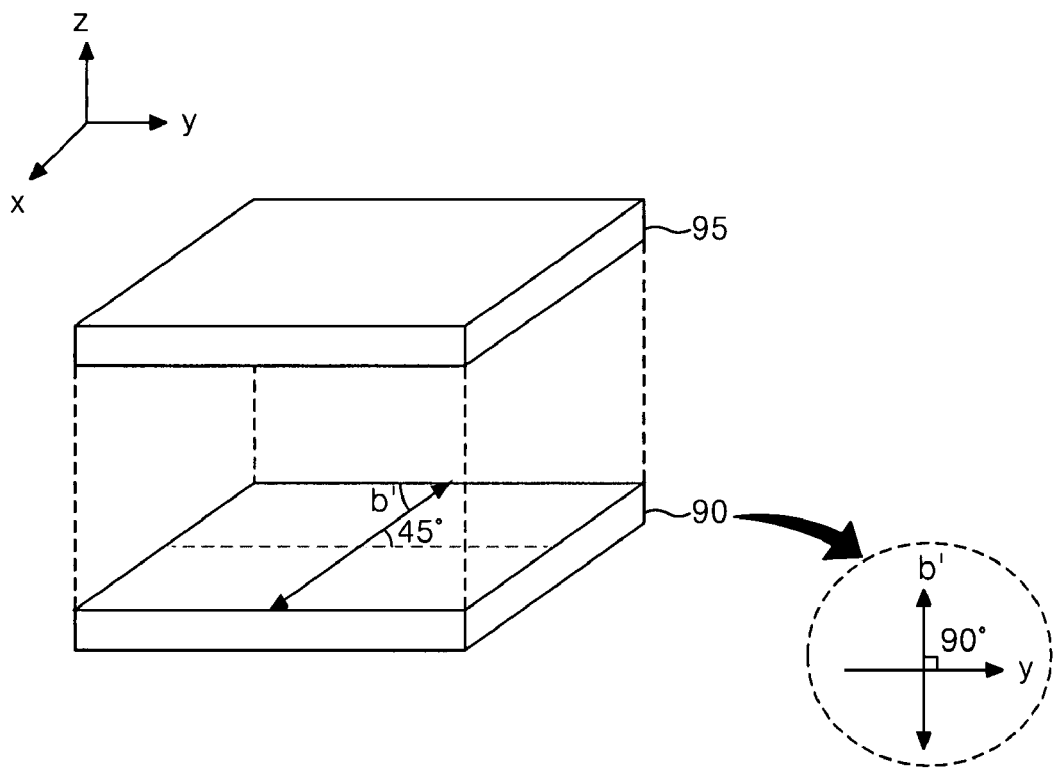
FIG. 8 illustrates a viewing angle controllable liquid crystal display device according to the third embodiment of the present invention.

FIG. 8 illustrates the brief structure of the viewing angle controllable liquid crystal display device according to the third embodiment of the present invention. Referring to FIG. 8, the viewing angle controllable liquid crystal display device includes a first panel 90 having a TN mode liquid crystal material for representing the video data, and a second panel 95 attaching to the first panel 90 for controlling the viewing angle of the video data selectively.

Figure 9:
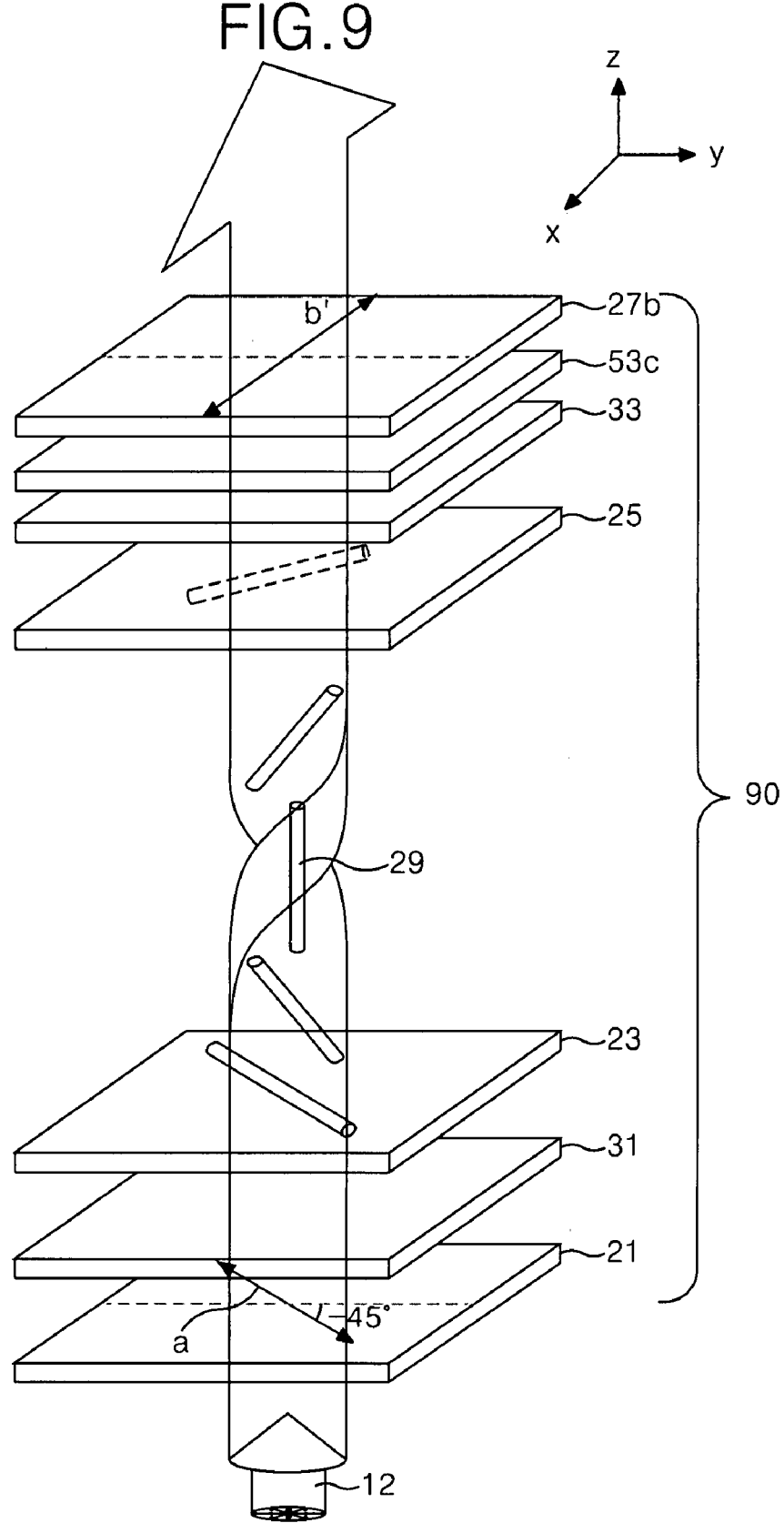
FIG. 9 illustrates a first panel shown in FIG. 8.

FIG. 9 illustrates a first panel shown in FIG. 8. Referring to FIG. 9, the first panel 90 includes a upper plate 24b having a common electrode 25, a half wave plate 53c and a upper polarizing plate 27b on the half wave plate 53c, a lower plate 22 having a pixel electrode 23 and a lower polarizing plate 21, and liquid crystal materials 29 positioned between the upper plate 24b and the lower plate 22. In an initial alignment state, the liquid crystal material 29 in the first panel 90 has a continuously twisted 90° stacking structure between the common electrode 25 and the pixel electrode 23. Unlike in the first and second embodiments, the light transmission axes (a and b') of the lower polarizing plate 21 and the upper polarizing plate 27b are not disposed perpendicular with respect to each other.

Here, the light transmission axes (a and b') of the lower polarizing plate 21 and the upper polarizing plate 27b would be described in detail. The light transmission axis (a) of the lower polarizing plate 21 is set to −45° direction from the Y-axis because that the lowest liquid crystal layer 29 is aligned to the −45° direction from the Y-axis for improving the gray inversion problem. The light transmission axis (b') of the upper polarizing plate 27b is set to parallel with the polarizing direction of the light passing the half wave plate 53c. The polarized direction of the light after passing through the half wave panel 53c is determined by the polarized direction of the light entering into the half wave plate 53c. In the third embodiment of the present invention, the light entering into the half wave plate 53c has passed through the liquid crystal material 29 of the first panel 90. The light path through the first panel 90 will be described in detail.

When an electric filed is not applied between the pixel electrode 23 and the common electrode 25, the liquid crystal material 29 maintains an initially aligned state. During the initially aligned state, the light entering into the first panel 90 transmits through the lower polarizing plate 21 at first. Then, it is linearly polarized so that the light parallel with the light transmission axis (a) of the lower polarizing plate 21 passes through. The linearly polarized light then passes through the continuously or helically twisted liquid crystal materials 29 so that the phase of the light will be retarded. Therefore, the light passing through the liquid crystal material 29 of the first panel 90 is linearly polarized at +45° with respect to the Y-axis. The light then enters into the half wave plate 53c. The half wave plate 53c rotates the linearly polarized direction of the light by 45° more. As a result, the light from the half wave plate 53c is linearly polarized at 90° with respect to the Y-axis. Therefore, the light transmission axis (b') of the upper polarizing plate 27 included in the first panel 90 should be set be at 90° with respect to the Y-axis.

Here, the first upper plate 24b and the lower plate 22 of the first panel 90 can further include viewing angle compensation films 31 or 33 for enhancing the view angle in the wide view angle mode. The light linearly polarized to 90° direction from the Y-axis enters into the second panel 95.

The second panel 95 of the third embodiment for the present invention includes an upper plate and lower plate joining each other with a cell gap, and an ECB liquid crystal material between them. The ECB liquid crystal material can control the light linearly polarized at 90° with respect to the Y-axis after passing the first panel in bilateral symmetry, especially in narrow view angle mode. The structure of the second panel 95 will be described with referring to the FIGS. 10A and 10B.

Figure 10A:
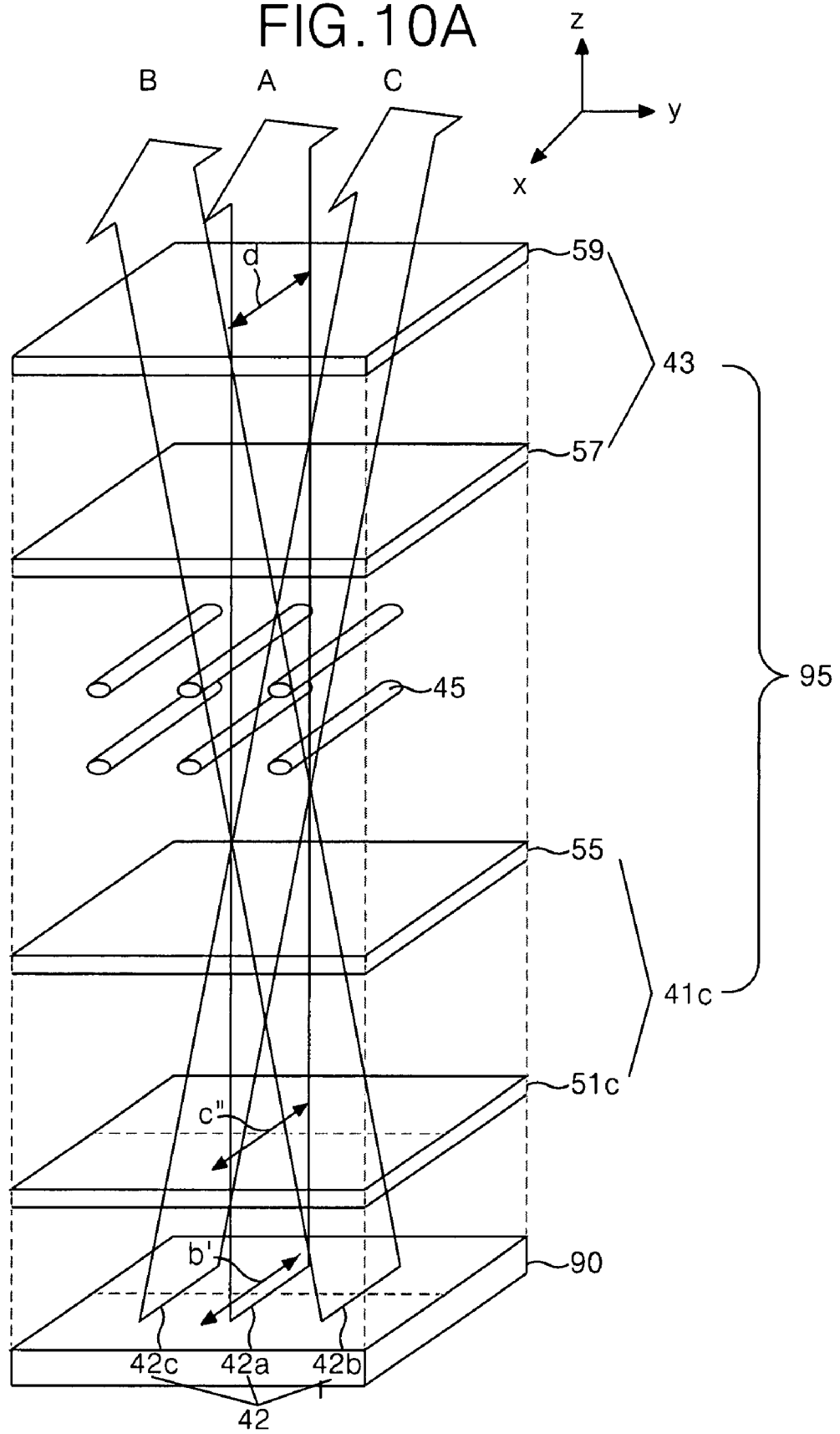
FIGS. 10A and 10B illustrate the wide view angle mode and the narrow view angle mode of a viewing angle controllable liquid crystal display device according to the third embodiment of the present invention.
Figure 10B:
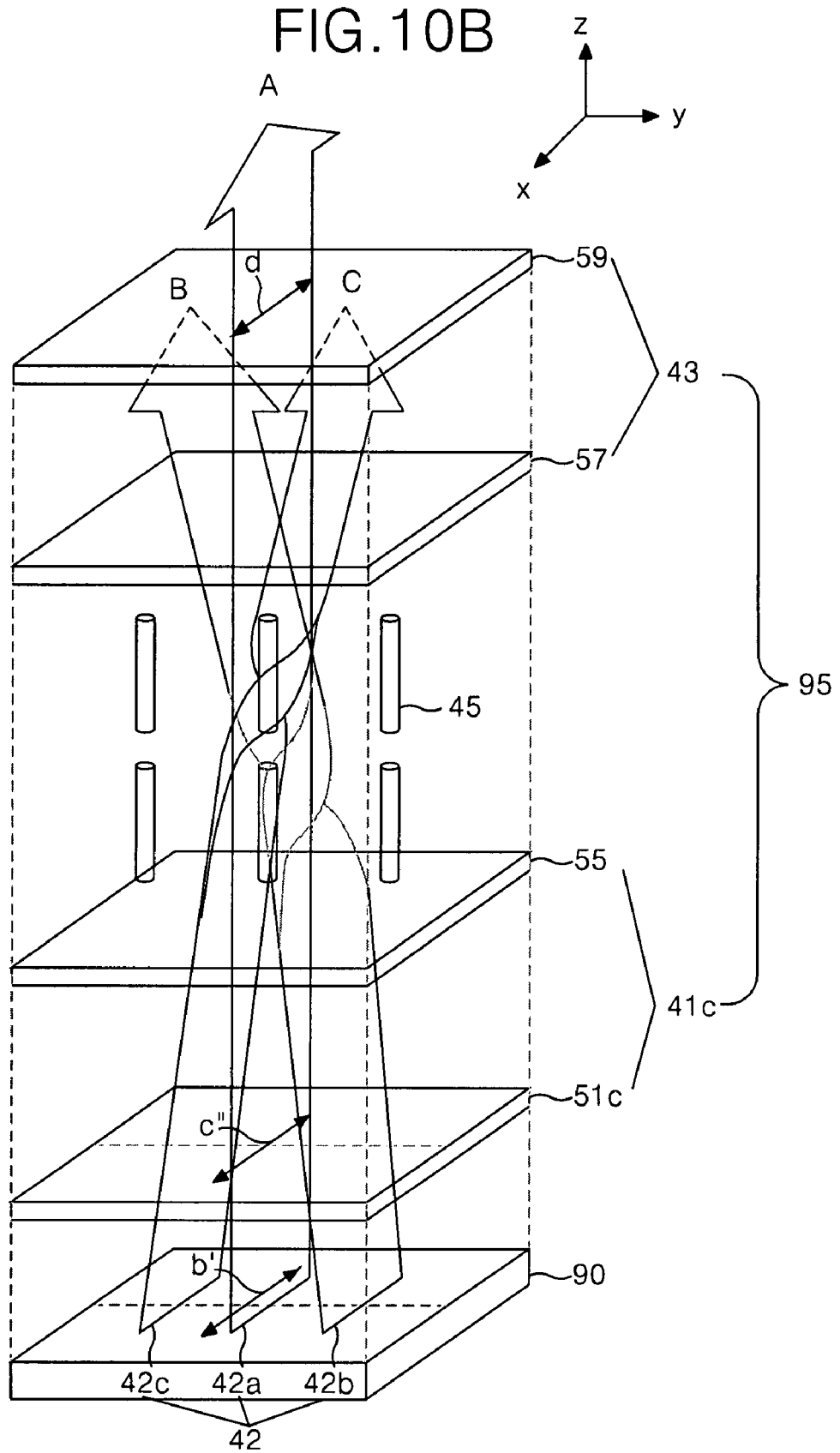

The FIGS. 10A and 10B illustrate the wide viewing angle mode and the narrow viewing angle mode of the viewing angle controllable liquid crystal display device according to the third embodiment. The second panel 95 according to the third embodiment of the present invention includes an upper plate 43 having an upper polarizing plate 59 and a first electrode 57, a lower plate 41c having a lower polarizing plate 51c and a second electrode 55, and ECB liquid crystal materials 45 positioned between the upper plate 43 and the lower plate 41c. The light transmission axis (d) of the upper polarizing plate 59 is disposed to parallel with the major axis of the ECB liquid crystal molecules 45 at initial alignment to transmit the light past the ECB liquid crystal molecules 45. The light transmission axis (c") of the lower polarizing plate 51c in the lower plate 41c of the second panel 95 is parallel to the linearly polarized direction of the light past the first panel 90. As the light passing the first panel 90 according to the third embodiment is linearly polarized to 90° direction from the Y-axis, the light transmission axis (c") of the lower polarizing plate 51c should be set to 90° direction from the Y-axis. Therefore, the light maintains its polarized condition after passing through the lower polarizing plate 51c. After that, the light enters into the ECB liquid crystal molecules 45. The methods for obtaining the narrow and wide viewing angle modes are the same as described with regard to FIGS. 4A and 4B so it will not be described again.

The FIGS. 11A and 11B are the contour maps illustrating the transmission characteristics of the wide view angle mode and the narrow viewing angle mode in the viewing angle controllable liquid crystal display device of FIGS. 10A and 10B, respectively. In the third embodiment of the present invention, the second panel can control the viewing angle of the light linearly polarized at 90° with respect to the Y-axis using the half wave plate 53c included in the first panel 90 with bilateral symmetry. The viewing angle controllable device according to the third embodiment can narrow the viewing angle mode with bilateral symmetry. In the third embodiment, the lower polarizing plate 51c of the second panel 95 can be removed for the same reason as in the first embodiment.

FIG. 12 illustrates the light transmission axis (e) of the half wave plates 53a, 53b, and 53c shown in FIGS. 4A, 6A and 9, respectively. As described above, the half wave plates 53a, 53b, and 53c rotate the polarized direction of linearly polarized light. The finally rotated polarized direction is determined by the angle difference between the direction of the light transmission axis (e) of the half wave plates 53a, 53b, and 53c and the polarized direction of the incident light. Therefore, the light transmission axis (e) of the half wave plates 53a, 53b, and 53c should be oriented by considering the polarizing direction of the light linearly polarized at +45° with respect to the Y-axis or lateral axis. To change the light from being linearly polarized at +45° to 90° with respect to the Y-axis, the light transmission axis (e) of the half wave plates 53a, 53b, and 53c is set to be plus or minus 5°~35° to an axis at +45° with respect to the Y-axis. In other words, the light transmission axis (e) of the half wave plates 53a, 53b, and 53c can be set within the ranges of 50°~80° with respect to the Y-axis and or 10°~40° with respect to the Y-axis so as to change the light from being linearly polarized at +45° with respect to the Y-axis to being linearly polarized at 90° with respect to the Y-axis. To keep light loss at a minimum, the light transmission axis (e) of the half wave plates 53a, 53b, and 53c should be set in 45°±22.5° from the Y-axis. In other words, the light transmission axis (e) of the half wave plates 53a, 53b, and 53c would be preferably set in 22.5° or 67.5° with respect to the Y-axis.

The half wave plates 53a, 53b, and 53c change the polarizing direction of the visible light within the wavelengths of 400 nm~700 nm. To change the polarizing direction of the light in wider range of wavelengths, the half wave plate 53a or 51a would have to be a wide band half wave plate. The wide band half wave plate has the structure of two or more half wave plates overlapped such that the material for retarding phase can affect to a wider band of light wavelengths.

As described in the above mentioned embodiments, the viewing angle controllable LCD device according to embodiments of the present invention includes a TN mode panel for representing video data, a ECB mode panel for controlling the viewing angle of the video data and a half wave plate for controlling the viewing angle in bilateral symmetry. In addition, the viewing angle controllable LCD device according to embodiments of the present invention can accomplish the bilateral symmetry viewing angle control just by applying a viewing angle controlling panel having a half wave plate or by attaching a half wave plate on the TN mode panel, without changing the conventional TN mode panel.

It should be understood that the invention is not limited to the embodiments. Various changes or modifications can be made under the condition that those changes or modifications do not depart from the spirit of the invention. Accordingly, the scope of the invention shall be determined only by the appended claims and its equivalents.

What is claimed is:

1. A viewing angle controllable liquid crystal display device, comprising:
    a first panel including twisted nematic liquid crystal molecules oriented to transmit polarized light at an 45° off-angle from a lateral axis of the device for preventing a gray inversion at side viewing angles;
    a half wave plate structure for delaying a phase of the polarized light from the first type of liquid molecules so that the polarized light after passing the twisted nematic liquid crystal molecules is reoriented to be perpendicular to the lateral axis of the display device; and
    a second panel disposing above the half wave plate, including electrically controlled birefringence liquid crystal molecules for selectively switching between narrow and wide viewing angles of the reoriented light after passing the half wave plate with a bilateral symmetry.

2. The viewing angle controllable liquid crystal display device according to claim 1, wherein the TN mode liquid crystal molecules are positioned between a common electrode and a pixel electrode of the first panel.

3. The viewing angle controllable liquid crystal display device according to claim 2, wherein the first panel includes an upper polarizer.

4. The viewing angle controllable liquid crystal display device according to claim 3, wherein the first panel includes an optical film between the upper polarizer and the pixel electrode.

5. The viewing angle controllable liquid crystal display device according to claim 3, wherein the first panel includes the half wave plate structure is disposed between the upper polarizer and the pixel electrode.

6. The viewing angle controllable liquid crystal display device according to claim 1, wherein the electrically controlled birefringence liquid crystal molecules are positioned between a first electrode and a second electrode of the second panel.

7. The viewing angle controllable liquid crystal display device according to claim 6, wherein the second panel includes a lower polarizing plate for receiving the polarized light at the 45° off-angle from the lateral axis.

8. The viewing angle controllable liquid crystal display device according to claim 7, wherein the half wave plate structure is disposed between the second electrode and the lower polarizing plate.

9. The viewing angle controllable liquid crystal display device according to claim 1, wherein the half wave plate structure is between the first and second panels.

10. The viewing angle controllable liquid crystal display device according to claim 1, wherein the half wave plate structure has at least two half wave plates overlapped.

11. A viewing angle controllable liquid crystal display device according to claim 1, wherein
    the twisted nematic liquid crystal molecules are positioned between an upper polarizer and a pixel electrode of the first panel;
    the half wave plate structure delays a phase of the light from the twisted nematic liquid crystal molecules;
    the electrically controlled birefringence liquid crystal molecules are positioned between an upper polarizing plate and a lower polarizing plate; and
    the upper polarizer has first transmission axial direction different than a second transmission axial direction of the upper polarizing plate.

12. The viewing angle controllable liquid crystal display device according to claim 11, wherein the first transmission axial direction is parallel to the lateral axis of the display device.

13. The viewing angle controllable liquid crystal display device according to claim 11, wherein the second transmission axial direction is at 45° with respect to the lateral axis of the device.

14. The viewing angle controllable liquid crystal display device according to claim 11, wherein the half wave plate structure is between the first and second panels.

15. The viewing angle controllable liquid crystal display device according to claim 11, wherein the half wave plate structure is between the electrically controlled birefringence liquid crystal molecules and the lower polarizing plate.

16. The viewing angle controllable liquid crystal display device according to claim 11, wherein the half wave plate structure is between the upper polarizer and the twisted nematic liquid crystal molecules.

17. A viewing angle controllable liquid crystal display device, comprising:
    twisted nematic liquid crystal molecules positioned between an upper polarizer and a pixel electrode of a first panel for delaying a phase of light polarized at an 45° off-angle from a lateral axis of the device to prevent a gray inversion at side viewing angles to change polarization direction of the light by 90°;
    a half wave plate structure for delaying a phase of the light from the twisted nematic liquid crystal molecules to further change polarization direction by 45°; and
    electrically controlled birefringence liquid crystal molecules positioned between an upper polarizing plate and a lower polarizing plate for selectively switching between narrow and wide viewing angles of the light after passing the half wave plate with a bilateral symmetry, wherein the upper polarizer has first transmission axial direction having a 45° difference with a second transmission axial direction of the upper polarizing plate.

18. The viewing angle controllable liquid crystal display device according to claim 17, wherein the lower polarizing plate has a third transmission axial direction parallel to the a second transmission axial direction of the upper polarizing plate.

* * * * *